(12) United States Patent
Anahid et al.

(10) Patent No.: US 11,531,920 B2
(45) Date of Patent: Dec. 20, 2022

(54) SYSTEM AND PROCESS FOR VERIFYING POWDER BED FUSION ADDITIVE MANUFACTURING OPERATION AS BEING DEFECT FREE

(71) Applicant: Raytheon Technologies Corporation, Farmington, CT (US)

(72) Inventors: Masoud Anahid, Simsbury, CT (US); Tahany Ibrahim El-Wardany, Vernon, CT (US); Sergei F. Burlatsky, West Hartford, CT (US); William K. Tredway, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 191 days.

(21) Appl. No.: 16/859,349

(22) Filed: Apr. 27, 2020

(65) Prior Publication Data

US 2021/0334685 A1 Oct. 28, 2021

(51) Int. Cl.
*G06N 7/00* (2006.01)
*G05B 19/4099* (2006.01)

(52) U.S. Cl.
CPC ......... *G06N 7/005* (2013.01); *G05B 19/4099* (2013.01); *G05B 2219/49023* (2013.01)

(58) Field of Classification Search
CPC ................ G06N 7/005; G05B 19/4099; G05B 2219/49023
See application file for complete search history.

(56) References Cited

U.S. PATENT DOCUMENTS

| | | |
|---|---|---|
| 10,234,848 B2 | 3/2019 | Mehr et al. |
| 10,252,511 B2 | 4/2019 | Burlatsky et al. |
| 10,406,760 B2 | 9/2019 | Shuck et al. |
| 10,525,629 B2 | 1/2020 | Zhang et al. |
| 2009/0228228 A1* | 9/2009 | Badger ................ G01N 21/956 702/83 |
| 2014/0107823 A1 | 4/2014 | Huang |

(Continued)

FOREIGN PATENT DOCUMENTS

EP 3459715 3/2019

OTHER PUBLICATIONS

European Search Report for European Patent Application No. 21170787.2 dated Sep. 15, 2021.

*Primary Examiner* — Thomas C Lee
*Assistant Examiner* — Ameir Myers
(74) *Attorney, Agent, or Firm* — Carlson, Gaskey & Olds, P.C.

(57) ABSTRACT

A method of evaluating an additive manufacturing process includes receiving a set of additive manufacturing parameters and an additive manufacturing part design at an analysis module, receiving a set of random values at the analysis module, determining a probability distribution of stochastic flaws within a resultant additively manufactured article using at least one multidimensional space physics model, and categorizing the additive manufacturing part design as defect free when the probability distribution is below a predefined threshold. Each value in the set of random values corresponds to a distinct variable in a set of variables. Each variable in the set of variables at least partially defines at least one of an uncontrolled additive manufacturing parameter and an uncontrollable additive manufacturing parameter.

20 Claims, 3 Drawing Sheets

(56) References Cited

U.S. PATENT DOCUMENTS

| | | | |
|---|---|---|---|
| 2017/0291368 A1* | 10/2017 | Burlatsky | ............ B29C 64/153 |
| 2018/0356778 A1* | 12/2018 | Acharya | ............ G05B 19/4099 |
| 2019/0251213 A1* | 8/2019 | Bishop | ................... G06F 30/20 |
| 2019/0283333 A1 | 9/2019 | Hwang et al. | |
| 2019/0384274 A1* | 12/2019 | Bharadwaj | ............ B22F 10/20 |
| 2021/0141970 A1* | 5/2021 | Xu | ....................... B29C 64/153 |

* cited by examiner

SYSTEM AND PROCESS FOR VERIFYING POWDER BED FUSION ADDITIVE MANUFACTURING OPERATION AS BEING DEFECT FREE

GOVERNMENT RIGHTS

This invention was made with Government support under FA8650-16-2-5700 awarded by the United States. The Government has certain rights in this invention.

TECHNICAL FIELD

The present disclosure relates generally to additive manufacturing, and more specifically to a process for predicting stochastic defects resulting from an additive manufacturing operation.

BACKGROUND

Additive manufacturing is a process that is utilized to create components by applying sequential material layers, with each layer being applied to the previous material layer. As a result of the iterative, trial-and-error construction process, multiple different parameters affect whether an end product created using the additive manufacturing process includes flaws, or is within acceptable tolerances of a given part. Typically, components created using an additive manufacturing process are designed iteratively, by adjusting one or more parameters for each iteration and examining the results to determine if the results have the required quality.

In some components, such as aircraft components, or other components with high tolerances, a substantial number of iterations can be required before determining a set of parameters that results in a component with an acceptable quality level. This iterative process can require months or years in order to refine a single part.

SUMMARY OF THE INVENTION

An exemplary method of evaluating an additive manufacturing process includes receiving a set of additive manufacturing parameters and an additive manufacturing part design at an analysis module, receiving a set of random values at the analysis module, each value in the set of random values corresponds to a distinct variable in a set of variables, and each variable in the set of variables at least partially defines at least one of an uncontrolled additive manufacturing parameters and an uncontrollable additive manufacturing parameters, determining a probability distribution of stochastic flaws within a resultant additively manufactured article using at least one multidimensional space physics model, and categorizing the additive manufacturing part design as defect free when the probability distribution is below a predefined threshold.

In another example of the above described method, receiving the set of random values at the analysis module comprises generating the set of random values using a random variable module, and wherein each variable in the set of variables corresponds to a distinct one of the at least one of the uncontrolled additive manufacturing parameters and the uncontrollable additive manufacturing parameters.

In another example of any of the above described exemplary methods of evaluating an additive manufacturing process the uncontrolled additive manufacturing parameters and the uncontrollable additive manufacturing parameters include at least one of a local powder packing density, a hatch-contour offset, an interlayer dwell time, a powder particle size, a stripe overlap, a layer thickness, and a stripe width.

In another example of any of the above described exemplary methods of evaluating an additive manufacturing process the uncontrolled additive manufacturing parameters and the uncontrollable additive manufacturing parameters include each of a local powder packing density, a hatch-contour offset, an interlayer dwell time, a powder particle size, a stripe overlap, a layer thickness, and a stripe width.

In another example of any of the above described exemplary methods of evaluating an additive manufacturing process receiving the set of random values is reiterated at least 2000 times to determine the probability distribution of stochastic flaws.

Another example of any of the above described exemplary methods of evaluating an additive manufacturing process further includes manufacturing a part according to the additive manufacturing part design in response to the probability distribution being below the predefined threshold.

In another example of any of the above described exemplary methods of evaluating an additive manufacturing process the at least one multidimensional space physics model includes at least one of a model for determining a probability of stochastic unmelt, a probability of stochastic keyhole flaws, a probability of stochastic balling, a probability of stochastic overhang, and a probability of stochastic unmelt with balling.

In another example of any of the above described exemplary methods of evaluating an additive manufacturing process the at least one multidimensional space physics model includes all of the model for determining a probability of stochastic unmelt, the probability of stochastic keyhole flaws, the probability of stochastic balling, the probability of stochastic overhang, and the probability of stochastic unmelt with balling.

Another example of any of the above described exemplary methods of evaluating an additive manufacturing process further includes determining a correlation between at least one variable in the set of variables and the probability of the occurrence of at least one of the stochastic flaws.

In another example of any of the above described exemplary methods of evaluating an additive manufacturing process the step of determining the probability distribution of stochastic flaws is adapted based on the determined correlation.

In one exemplary embodiment an additive manufacturing apparatus includes a chamber, a platform within the chamber, and a controller, the controller including a processor and a memory, the memory storing instructions for causing the controller to determine a probability distribution of stochastic flaws within a resultant additively manufactured article using at least one multidimensional space physics model and categorize the additive manufacturing part design as defect free when the probability distribution is below a predefined threshold in response to receiving a set of additive manufacturing parameters and an additive manufacturing part design at an analysis module stored in the controller and receiving a set of random values each value in the set of random values corresponds to a distinct variable in a set of variables, and each variable in the set of variables at least partially defines at least one of an uncontrolled additive manufacturing parameters and an uncontrollable additive manufacturing parameters.

In another example of the above described additive manufacturing apparatus receiving the set of random values includes generating the set of random values using a random variable module, and wherein each variable in the set of variables corresponds to a distinct one of the at least one of the uncontrolled additive manufacturing parameters and the uncontrollable additive manufacturing parameters.

In another example of any of the above described additive manufacturing apparatuses the uncontrolled additive manufacturing parameters and the uncontrollable additive manufacturing parameters include at least one of a local powder packing density, a hatch-contour offset, an interlayer dwell time, a powder particle size, a stripe overlap, a layer thickness, and a stripe width.

In another example of any of the above described additive manufacturing apparatuses the uncontrolled additive manufacturing parameters and the uncontrollable additive manufacturing parameters include each of a local powder packing density, a hatch-contour offset, an interlayer dwell time, a powder particle size, a stripe overlap, a layer thickness, and a stripe width.

In another example of any of the above described additive manufacturing apparatuses the set of random values is reiterated at least 2000 times to determine the probability distribution of stochastic flaws.

In another example of any of the above described additive manufacturing apparatuses the controller further includes instructions for causing the additive manufacturing system to manufacture a part according to the additive manufacturing part design in response to the probability distribution being below the predefined threshold.

In another example of any of the above described additive manufacturing apparatuses the at least one multidimensional space physics model includes at least one of a model for determining a probability of stochastic unmelt, a probability of stochastic keyhole flaws, a probability of stochastic balling, a probability of stochastic overhang, and a probability of stochastic unmelt with balling.

In another example of any of the above described additive manufacturing apparatuses the at least one multidimensional space physics model includes all of the model for determining a probability of stochastic unmelt, the probability of stochastic keyhole flaws, the probability of stochastic balling, the probability of stochastic overhang, and the probability of stochastic unmelt with balling.

Another example of any of the above described additive manufacturing apparatuses further includes determining a correlation between at least one variable in the set of variables and the probability of the occurrence of at least one of the stochastic flaws.

In another example of any of the above described additive manufacturing apparatuses the step of determining the probability distribution of stochastic flaws is adapted based on the determined correlation.

These and other features of the present invention can be best understood from the following specification and drawings, the following of which is a brief description.

DETAILED DESCRIPTION

Figure 1:
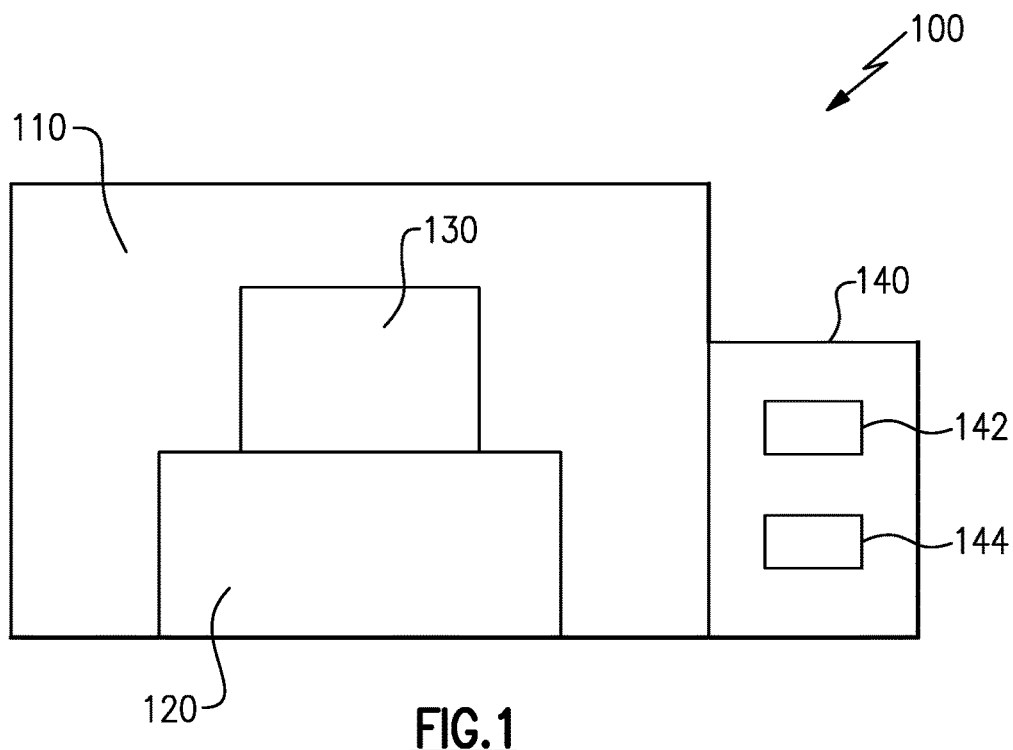
FIG. 1 illustrates a high level schematic view of an exemplary additive manufacturing system.

FIG. 1 schematically illustrates an additive manufacturing machine 100, such as a laser powder bed fusion additive manufacturing machine. In alternate examples, the powder bed fusion machine can be an electron beam powder bed fusion machine. The exemplary additive manufacturing machine 100 includes a manufacturing chamber 110 with a platform 120 upon which a part 130 (alternatively referred to as a work piece) is additively manufactured. A controller 140 is connected to the chamber 110 and controls the additive manufacturing process according to any known additive manufacturing control system.

Included within the controller 140 is a processor 142 that receives and interprets input operations to define a sequence of the additive manufacturing, and a memory 144 that stores software modules for directing the controller 142 and for analyzing received operations. As utilized herein "operations" refers to instructions specifying operational conditions and sequences for one or more step in an additive manufacturing process. The controller 140 can, in some examples, include user interface devices such as a keyboard and view screen. In alternative examples, the controller 140 can include a wireless or wired communication apparatus for communicating with a remote user input device such as a PC.

In an example operation, a part design is provided by a user to the controller 140. The part design is typically a 3D modeling file, such as an .stl file. The controller 140 includes internal software modules that convert the .stl file into an additive manufacturing process, and the additive manufacturing machine 100 executes the process to create the part.

Flaws such as unmelt, keyhole, balling, overhang, unmelt with balling, and the like can occur either as a result of non-optimal machine parameters or randomly as a result of stochastic variation of uncontrolled and uncontrollable build parameters during additive manufacturing operation. It is possible to prevent the flaws generated systematically as a result of non-optimal machine parameters. However, stochastic flaws can occur randomly even when the process is configured to be performed under optimal conditions, and need special attention. Generation of the random stochastic flaws prevents widespread adoption of additive manufacturing technologies in some industries because the stochastic flaws can have detrimental effects on fatigue life of the additively manufactured components. The impact on fatigue life complicates the process of qualification and approval of additively manufactured components.

Included within the controller 140 is a module for determining when a process will generate systematic or preventable flaws, and optimize the performance parameters of the additive manufacturing system 100 accordingly. However, even when optimized, such additive manufacturing processes still generate the stochastic flaws, and a manufacturing process that is certified as being free of preventable flaws may still include stochastic flaws and be unacceptable for a given application.

In order to determine if an operation is likely to generate stochastic flaws, the controller 140 includes an analysis tool that receives a part design and/or a set of operations and determines a statistical chance that the operation will generate stochastic flaws, and how many stochastic flaws are likely to develop. The tool analyzes the effect of statistical variation of build conditions on the formation of different types of defects in components produced using the additive manufacturing process. The stochastic analysis tool utilizes a deterministic defect prediction model to predict defect types, densities, and locations as a function of operational conditions and material properties. The physics based model provides the ability to calculate process maps for single and multi-hatch scans, to calculate process and defect maps based on physical understanding rather than semi empirical correlations, and the ability to build predicted three dimensional defect maps.

Figure 2:
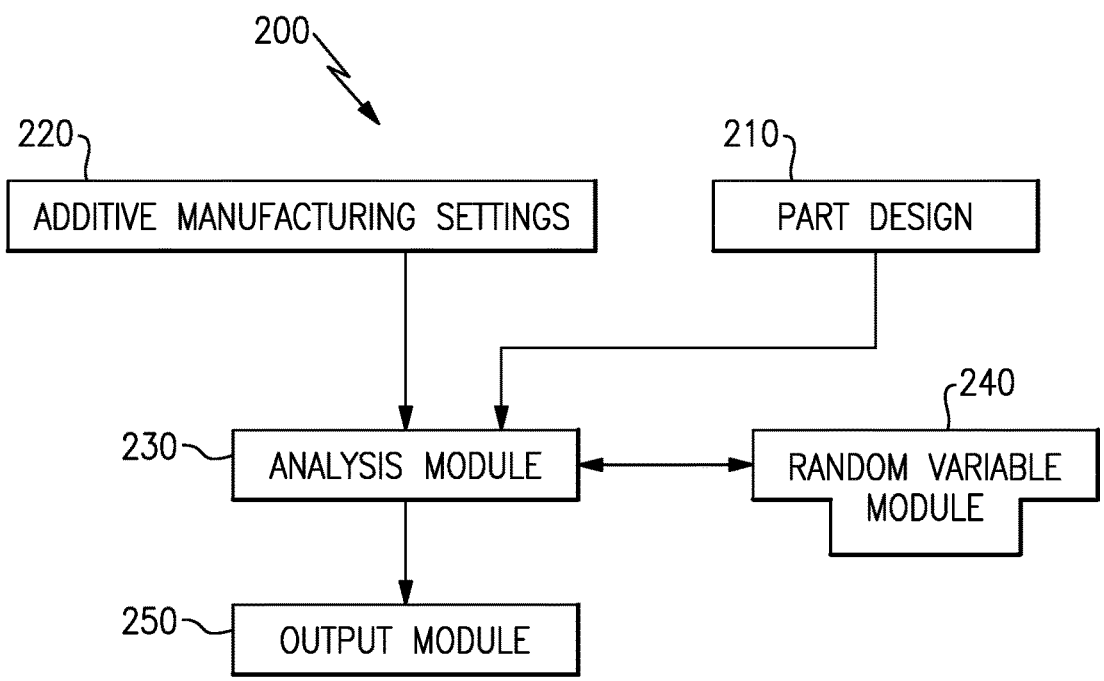
FIG. 2 schematically illustrates an exemplary analysis tool for determining a predicted distribution of stochastic flaws within a part design or additive manufacturing operation.

With continued reference to FIG. 1, FIG. 2 schematically illustrates an exemplary analysis tool 200 for determining a predicted distribution of stochastic flaws within a part design or additive manufacturing operation using a variation of Monte Carlo simulation statistical analysis. The tool 200 receives a part design and/or additive manufacturing operation at a part design input 210. In addition to the part design input 210, the tool receives a set of additive manufacturing settings via an additive manufacturing settings input 220. The additive manufacturing settings and the part design are provided to an analysis module 230, which is described in greater detail below with regards to FIG. 4. Also provided to the analysis module are a set of values for a set of random process variables. The values are generated by a random variable module 240, described in greater detail below with regards to FIG. 3. The random process variables represent uncontrolled or uncontrollable parameters of the additive manufacturing process.

Once all the inputs have been received at the analysis module 230, the analysis module 230 determines an estimated distribution of stochastic flaws in the resulting product of the received part design or operation. The analysis module 230 then sends a request to the random variable module 240 to generate a new set of values for the random variables, and the analysis module 230 reruns the analysis. This process is reiterated multiple times to generate a statistical distribution representative of the stochastic flaws expected from additive manufacture of the part based upon the defined operating parameters/settings. In one example, the process is reiterated 2000 times. The number of iterations in a given example is dependent on the number of random variables being analyzed with more random variables requiring more iterations.

The statistical distribution is provided to an output module 250. The output of the output module is then provided to a technician and includes a probability density function corresponding to each type of flaw and defining the probability of a defect free sample. As utilized herein, "defect free" refers to a sample that includes an amount or distribution of defects that is within an acceptable range for the particular product being additively manufactured. It is appreciated that a technician in the art can determine the appropriate range of defects that are acceptable for a "defect free" sample of a given product. For example, for a given part, a "defect free" sample may be one with a volume fraction of unmelt and keyhole flaws of less than 0.0002 and 0.0003, respectively. A definition of a "defect free" can be input into analysis module 230, and analysis module 230 determines the probability that a part sample will be defect free when the results from the output module 250 are within the definition of "defect free". By way of example, the defects included within the probability density function in one example are unmelt, keyhole, balling, overhang and unmelt with balling.

In alternative examples, the output module provides only the probability density function, and the determination of whether the resultant product qualifies as defect free is left up to the technician. In such an example, the technician uses their professional experience, combined with the probability density function to determine if the resultant product (including stochastic flaws) is "defect free" rather than leaving the determination to the computer based analysis.

Figure 3:
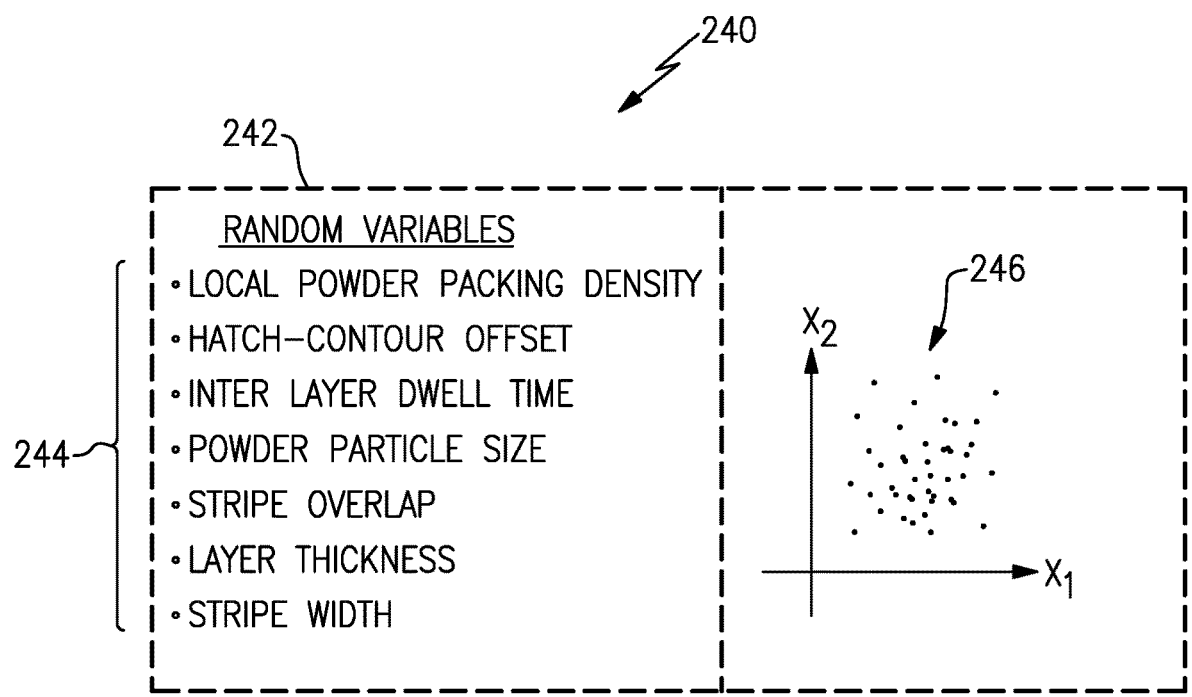
FIG. 3 schematically illustrates a random process variable module for the example of FIG. 2.
Figure 4:
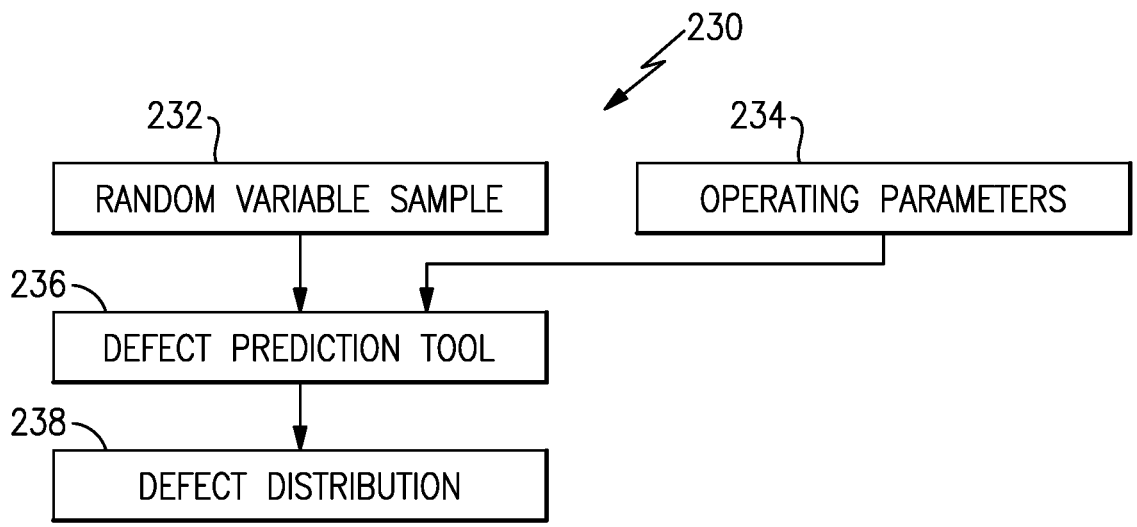
FIG. 4 schematically illustrates an analysis module for the example of FIG. 2.

With continued reference to FIGS. 1 and 2, FIG. 3 schematically illustrates the random variable module 240 according to one example. The random variable module 240 includes a list 242 of random variables 244 that each correspond to an uncontrolled or uncontrollable process parameter. As used herein an uncontrolled parameter is one that may be able to be controlled, but is not controlled in the given operation. Similarly, an uncontrollable parameter is one that cannot be controlled by the additive manufacturing system 100 (illustrated in FIG. 1). In the illustrated example, the list of uncontrolled and uncontrollable parameters includes a local powder packing density, a hatch-contour offset, an interlayer dwell time, a powder particle size, a stripe overlap, a layer thickness, and a stripe width. It is appreciated that alternative implementations can include a subset of these uncontrolled or uncontrollable parameters or additional uncontrolled or uncontrollable parameters, depending on the particular system.

Associated with each parameter having a random variable 244 on the list 242 of variables 244 is a distribution map 246. The distribution map 246 defines a possible distribution of the values that the corresponding random variable 244 can be, including data with regards to the odds of the value of the random variable being at a given value on the distribution map 246. In each iteration of the process described above, the module 240 identifies a value on the distribution for each random variable. The defined values for the random variables define a string of values for all of the variables 244 on the list 242. For example, if the distribution map 246 for a particular random variable 244 on the list 242 indicates that it is likely to have a particular value 50% of the time, then the random variable module 240 will return that particular value for that particular random variable 50% of the time. This string is then provided to the analysis module 230 for each iteration of the process.

With continued reference to FIGS. 1-3, FIG. 4 schematically illustrates an exemplary analysis module 230 according to one example. The module 230 combines a string of values for the random variables 232 with a set of variables 234 corresponding to controlled operating parameters, and utilizes a multi-dimensional analysis to predict the locations of, and frequency of at least one type of defect within the resultant part. In some examples, the defect prediction tool 236 includes multiple distinct multi-dimensional analysis systems with each multi-dimensional analysis system corresponding to a specific type of flaw. By way of example, the multi-dimensional analysis tool can include or be derived from the multi-dimensional analysis tool described in U.S. Pat. Nos. 10,254,730, 10,252,512, 10,252,511, 10,252,510, 10,252,509, 10,252,508, which are incorporated herein. The determined likelihood of each flaw is provided to a defect distribution file 238 that stores a correlation of all the flaws determined for the particular string of random variable values.

Figure 5:
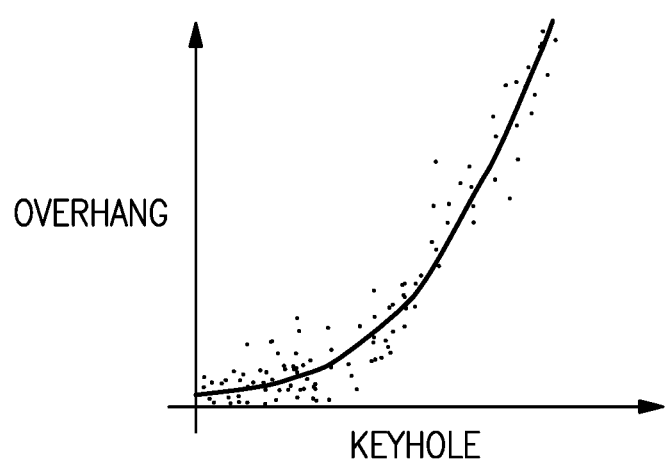
FIG. 5 is an exemplary chart correlating the occurrence of two stochastic flaws.

As the analysis tool 230 reiterates the analysis with new string of values for the random variables, the correlation data is accumulated in a multi-dimensional chart. The multidimensional chart correlates the occurrences of stochastic flaws with the random variables and with each other. An exemplary chart 300 correlating the occurrence of two stochastic flaws (overhang and keyhole) is illustrated in FIG. 5. It is appreciated that similar charts can be generated by the analysis module 230 and provided to the output as defined above for any correlation of multiple stochastic flaws.

In yet further examples, the output module can be provided to a qualification system that is configured to automatically qualify an additive manufacturing operation when the probability of manufacturing a sample containing a quantity or distribution of stochastic flaws that would characterize the sample as defective (i.e. a sample that is not "defect free") is below a predetermined threshold. In such an example, the additive manufacturing machine 100 of FIG. 1 can proceed directly to manufacturing the component according to the qualified operating parameters/settings. In alternative examples, the qualified component can be released to a manufacturing system, and the qualified operating parameters/settings can be used across multiple additive manufacturing systems 100.

With continued reference to all of FIGS. 1-5, it is appreciated that the stochastic flaw detection analysis tool assists engineers and designers to identify build conditions which result in minimal stochastic flaws in additively manufactured parts. The utilization of the multi-dimensional flaw detection models allows the tool 200 to operate fast, and generate a probability density function based on multiple thousands of random data points in minimal time, thereby reducing costly and time consuming trial and error practices currently used to qualify additively manufactured parts. In addition, the data determined from the tool 200 allows for the minimization of post-build operations in the production process chain.

In yet further examples, the controller 142 can determine correlations between one or more of the parameters corresponding to the random variables and the expected resultant stochastic flaws. These correlations can be determined according to any known statistical analysis system. The determined correlations are stored in the memory 144 and are referenced in future iterations of the method by the controller 142. In this way the method acts as an adaptive learning method and can improve over time.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of evaluating an additive manufacturing process comprising:
   receiving a set of additive manufacturing parameters and an additive manufacturing part design at an analysis module;
   generating a set of random values using a random number generator;
   receiving the set of random values at the analysis module, each value in the set of random values corresponds to a distinct variable in a set of variables, and each variable in the set of variables at least partially defines at least one of an uncontrolled additive manufacturing parameter and an uncontrollable additive manufacturing parameter;
   determining a probability distribution of stochastic flaws within a resultant additively manufactured article using at least one multidimensional space physics model;
   categorizing the additive manufacturing part design as defect free when the probability distribution is below a predefined threshold; and
   manufacturing a part according to the additive manufacturing part design in response to the probability distribution being below the predefined threshold.

2. The method of claim 1, and wherein each variable in the set of variables corresponds to a distinct one of the at least one of the uncontrolled additive manufacturing parameters and the uncontrollable additive manufacturing parameters.

3. The method of claim 2, wherein the uncontrolled additive manufacturing parameters and the uncontrollable additive manufacturing parameters include at least one of a local powder packing density, a hatch-contour offset, an interlayer dwell time, a powder particle size, a stripe overlap, a layer thickness, and a stripe width.

4. The method of claim 3, wherein the uncontrolled additive manufacturing parameters and the uncontrollable additive manufacturing parameters include each of a local powder packing density, a hatch-contour offset, an interlayer dwell time, a powder particle size, a stripe overlap, a layer thickness, and a stripe width.

5. The method of claim 1, wherein receiving the set of random values is reiterated at least 2000 times to determine the probability distribution of stochastic flaws.

6. The method of claim 1, wherein each random value in the set of random values is defined in a distribution map for the corresponding variable in the distinct set of variables, and the distribution map defines a possible distribution of the values that the corresponding random variable can be and includes data defining odds of the value of the random variable being at each value on the distribution map.

7. The method of claim 6, wherein each random value is randomly selected from the corresponding distribution map according to the odds defined in the corresponding distribution map.

8. The method of claim 1, wherein the at least one multidimensional space physics model includes at least one of a model for determining a probability of stochastic unmelt, a probability of stochastic keyhole flaws, a probability of stochastic balling, a probability of stochastic overhang, and a probability of stochastic unmelt with balling.

9. The method of claim 8, wherein the at least one multidimensional space physics model includes all of the model for determining a probability of stochastic unmelt, the probability of stochastic keyhole flaws, the probability of stochastic balling, the probability of stochastic overhang, and the probability of stochastic unmelt with balling.

10. The method of claim 1, further comprising determining a correlation between at least one variable in the set of variables and the probability of the occurrence of at least one of the stochastic flaws.

11. The method of claim 10, wherein the step of determining the probability distribution of stochastic flaws is adapted based on the determined correlation.

12. An additive manufacturing apparatus comprising:
   a chamber;
   a platform within the chamber; and
   a controller, the controller including a processor and a memory, the memory storing instructions for causing the controller to determine a probability distribution of stochastic flaws within a resultant additively manufactured article using at least one multidimensional space physics model and categorize the additive manufacturing part design as defect free when the probability distribution is below a predefined threshold in response to receiving a set of additive manufacturing parameters and an additive manufacturing part design at an analysis module stored in the controller and generating a set of random values using a random number generator, each value in the set of random values corresponds to a distinct variable in a set of variables, and each variable in the set of variables at least partially defines at least one of an uncontrolled additive manufacturing parameters and an uncontrollable additive manufacturing parameters, the controller further includes instructions for causing the additive manufacturing system to manufacture a part according to the additive manufacturing part design in response to the probability distribution being below the predefined threshold.

13. The additive manufacturing system of claim 12, wherein each variable in the set of variables corresponds to a distinct one of the at least one of the uncontrolled additive manufacturing parameters and the uncontrollable additive manufacturing parameters.

14. The additive manufacturing system of claim 13, wherein the uncontrolled additive manufacturing parameters and the uncontrollable additive manufacturing parameters include at least one of a local powder packing density, a hatch-contour offset, an interlayer dwell time, a powder particle size, a stripe overlap, a layer thickness, and a stripe width.

15. The additive manufacturing system of claim 14, wherein the uncontrolled additive manufacturing parameters and the uncontrollable additive manufacturing parameters include each of a local powder packing density, a hatch-contour offset, an interlayer dwell time, a powder particle size, a stripe overlap, a layer thickness, and a stripe width.

16. The additive manufacturing system of claim 12, wherein receiving the set of random values is reiterated at least 2000 times to determine the probability distribution of stochastic flaws.

17. The additive manufacturing system of claim 12, wherein the at least one multidimensional space physics model includes at least one of a model for determining a probability of stochastic unmelt, a probability of stochastic keyhole flaws, a probability of stochastic balling, a probability of stochastic overhang, and a probability of stochastic unmelt with balling.

18. The additive manufacturing system of claim 17, wherein the at least one multidimensional space physics model includes all of the model for determining a probability of stochastic unmelt, the probability of stochastic keyhole flaws, the probability of stochastic balling, the probability of stochastic overhang, and the probability of stochastic unmelt with balling.

19. The additive manufacturing system of claim 12, further comprising determining a correlation between at least one variable in the set of variables and the probability of the occurrence of at least one of the stochastic flaws.

20. The additive manufacturing system of claim 19, wherein the step of determining the probability distribution of stochastic flaws is adapted based on the determined correlation.

* * * * *